United States Patent
Bifulco et al.

(10) Patent No.: US 10,794,217 B2
(45) Date of Patent: Oct. 6, 2020

(54) BLEED VALVE SYSTEM

(71) Applicant: United Technologies Corporation, Farmington, CT (US)

(72) Inventors: Anthony R. Bifulco, Ellington, CT (US); Jason B. Hickman, Palm Beach Gardens, FL (US); Alonso Meza, West Palm Beach, FL (US); Andrew R. Carlson, Jensen Beach, FL (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 79 days.

(21) Appl. No.: 15/853,486

(22) Filed: Dec. 22, 2017

(65) Prior Publication Data

US 2019/0195082 A1 Jun. 27, 2019

(51) Int. Cl.
| | |
|---|---|
| *F01D 17/12* | (2006.01) |
| *F01D 17/10* | (2006.01) |
| *F02C 9/28* | (2006.01) |
| *F02C 6/08* | (2006.01) |
| *F02K 3/075* | (2006.01) |
| *F04D 27/02* | (2006.01) |
| *F16K 3/02* | (2006.01) |
| *F02K 3/06* | (2006.01) |

(52) U.S. Cl.
CPC .............. *F01D 17/105* (2013.01); *F02C 6/08* (2013.01); *F02C 9/28* (2013.01); *F02K 3/075* (2013.01); *F04D 27/0207* (2013.01); *F02K 3/06* (2013.01); *F05D 2220/32* (2013.01); *F05D 2250/41* (2013.01); *F05D 2270/101* (2013.01); *F16K 3/02* (2013.01)

(58) Field of Classification Search
CPC .... F01D 17/105; F01D 17/145; F01D 17/148; F05D 2260/606; F02C 9/18
See application file for complete search history.

(56) References Cited

U.S. PATENT DOCUMENTS

| | | | |
|---|---|---|---|
| 4,785,624 A | 11/1988 | Smith et al. | |
| 6,048,171 A | 4/2000 | Donnelly | |
| 6,226,977 B1 * | 5/2001 | Ichiryu | F23M 5/085 |
| | | | 60/39.23 |
| 7,340,880 B2 * | 3/2008 | Magoshi | F23R 3/045 |
| | | | 60/39.23 |

(Continued)

FOREIGN PATENT DOCUMENTS

| | | |
|---|---|---|
| EP | 0751282 A2 | 1/1997 |
| EP | 0879847 A2 | 11/1998 |
| FR | 3046199 A1 | 6/2017 |

OTHER PUBLICATIONS

European Search Report Application No. 18214956.7; dated May 27, 2019; pp. 9.

*Primary Examiner* — Ninh H. Nguyen
(74) *Attorney, Agent, or Firm* — Cantor Colburn LLP (57) ABSTRACT

A bleed valve system for a gas turbine engine that includes a retaining ring and a metering ring. The retaining ring abuts an end of a bleed air duct and defines a plurality of retaining ring apertures. The metering ring that is at least partially disposed within the bleed air duct and abuts the retaining ring, the metering ring defining a plurality of metering ring apertures, the metering ring being rotatable relative to the retaining ring to selectively facilitate a fluid flow through the bleed air duct.

14 Claims, 4 Drawing Sheets

(56) References Cited

U.S. PATENT DOCUMENTS

| | | | |
|---|---|---|---|
| 8,167,551 B2 | 5/2012 | Merry | |
| 9,334,759 B2 * | 5/2016 | Roy | F01K 7/04 |
| 9,347,334 B2 * | 5/2016 | Joe | F01D 11/24 |
| 9,593,590 B2 | 3/2017 | Ebert | |
| 9,797,314 B2 | 10/2017 | Hillel | |

* cited by examiner

BLEED VALVE SYSTEM

BACKGROUND

Exemplary embodiments pertain to the art of gas turbine engines having bypass control systems.

Gas turbine engines are provided with a bleed valve arrangement that diverts a pressurized fluid from entering a flow path into the core of the gas turbine engine. Commonly a plurality of hinged doors or valves, such as butterfly valves, are disposed or aligned in respective windows. The butterfly valves are actuated by a synchronous ring and multiple linkages that meter flow. Defects or deflection of a component such as the linkages may compromise the ability of the bleed valve arrangement to provide uniform flow.

BRIEF DESCRIPTION

Disclosed is a bleed valve system for a gas turbine engine that includes a retaining ring and a metering ring. The retaining ring abuts an end of a bleed air duct and defines a plurality of retaining ring apertures. The metering ring that is at least partially disposed within the bleed air duct and abuts the retaining ring, the metering ring defining a plurality of metering ring apertures, the metering ring being rotatable relative to the retaining ring to selectively facilitate a fluid flow through the bleed air duct.

In addition to one or more of the features described herein, the metering ring is provided with at least one bracket.

In addition to one or more of the features described herein, the bleed valve system includes a drive shaft that extends into the bleed air duct and is operatively connected to the at least one bracket by a lever arm.

In addition to one or more of the features described herein, the drive shaft is arranged to rotate about an axis such that the lever arm moves to rotate the metering ring relative to the retaining ring.

Also disclosed is a gas turbine engine having a case and a bleed valve system. The case surrounds a main body that is disposed about a central longitudinal axis. The main body has a first wall that extends between a first wall first end and a first wall second end, a second wall that extends between a second wall first end and a second wall second end, and an intermediate wall disposed between the first wall and the second wall and extends between an intermediate wall first end and an intermediate wall second end. The bleed valve system includes a retaining ring and a metering ring. The retaining ring is disposed between the first wall and the intermediate wall. The retaining ring has a first portion that defines a plurality of retaining ring apertures and a second portion that extends from the first portion towards the intermediate wall second end. The metering ring abuts the first portion and defines a plurality of metering ring apertures.

In addition to one or more of the features described herein, a pocket is defined between the intermediate wall second end, the second portion, and the first portion.

In addition to one or more of the features described herein, the bleed valve system includes a biasing member disposed in the pocket, the biasing member being arranged to urge the metering ring against the retaining ring.

In addition to one or more of the features described herein, the metering ring is at least partially received within the pocket.

In addition to one or more of the features described herein, the intermediate wall first end is connected to the second wall.

In addition to one or more of the features described herein, the main body has an end wall that extends between the first wall first end and the second wall first end.

In addition to one or more of the features described herein, a bleed air duct is defined between the first wall and the intermediate wall.

In addition to one or more of the features described herein, a bleed air inlet is defined by the second wall.

In addition to one or more of the features described herein, the bleed air inlet is disposed between the first wall first end and the intermediate wall first end.

In addition to one or more of the features described herein, a bleed air outlet is defined between first wall second end and the intermediate wall second end.

In addition to one or more of the features described herein, a bypass duct is defined between the case and the first wall.

In addition to one or more of the features described herein, the bleed valve system includes a lever arm that is operatively connected to the metering ring and a drive shaft that extends through the first wall and into the bleed air duct and is operatively connected to the lever arm.

In addition to one or more of the features described herein, the drive shaft is arranged to actuate the lever arm to rotate the metering ring about the central longitudinal axis relative to the retaining ring to move the bleed valve system between an open position and a closed position.

In addition to one or more of the features described herein, the plurality of metering ring apertures are approximately aligned with the plurality of retaining ring apertures while the bleed valve system is in the open position to facilitate a fluid flow through the bleed air duct.

In addition to one or more of the features described herein, the plurality of metering ring apertures are not aligned with the plurality of retaining ring apertures while the bleed valve system is in the closed position to inhibit a fluid flow through the bleed air duct.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
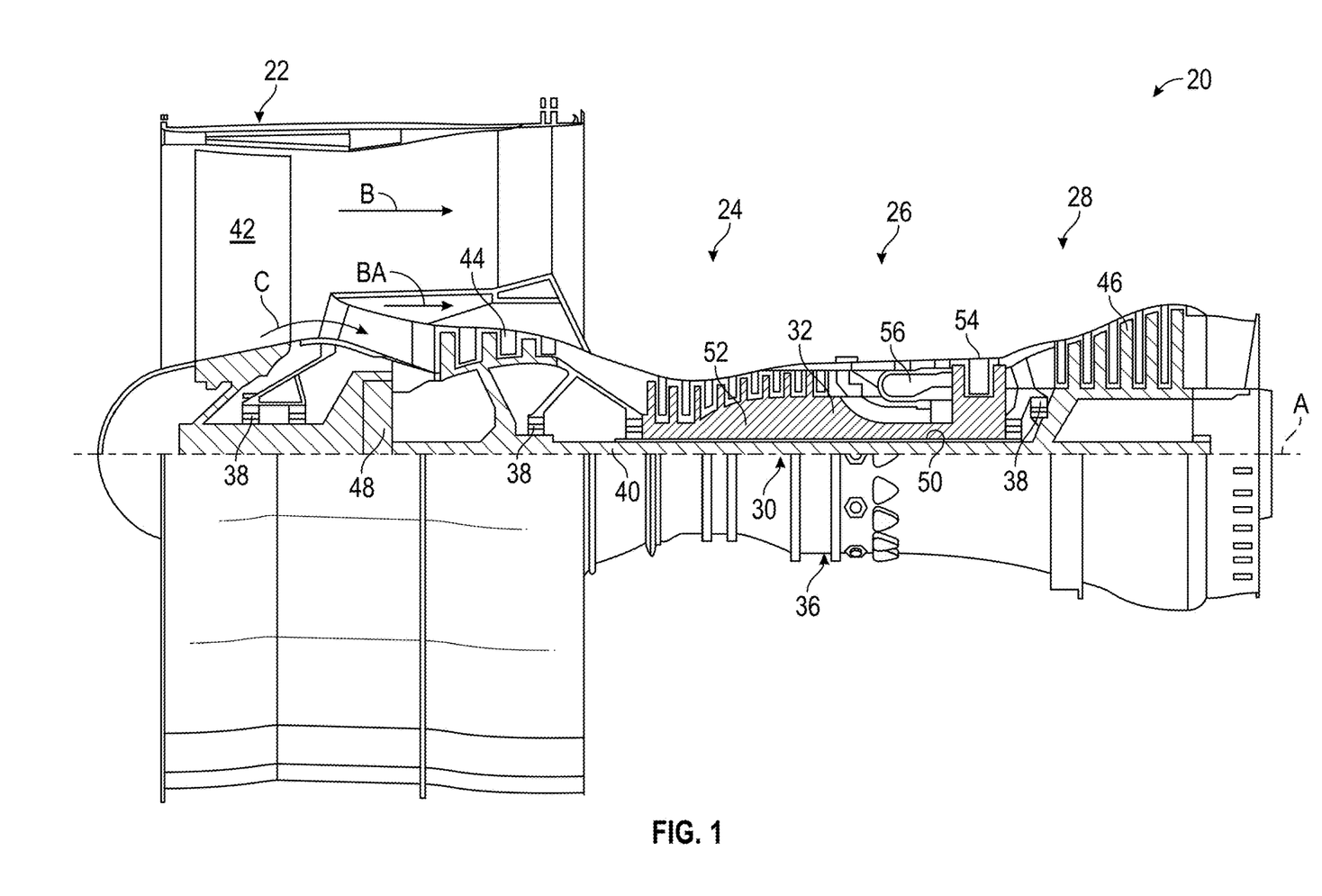
FIG. 1 is a schematic illustration of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram \ ° R)/(518.7° R)]^{0.5}$. The "Low corrected fan tip speed" as disclosed herein according to one non-limiting embodiment is less than about 1150 ft/second (350.5 m/sec).

Figure 2:
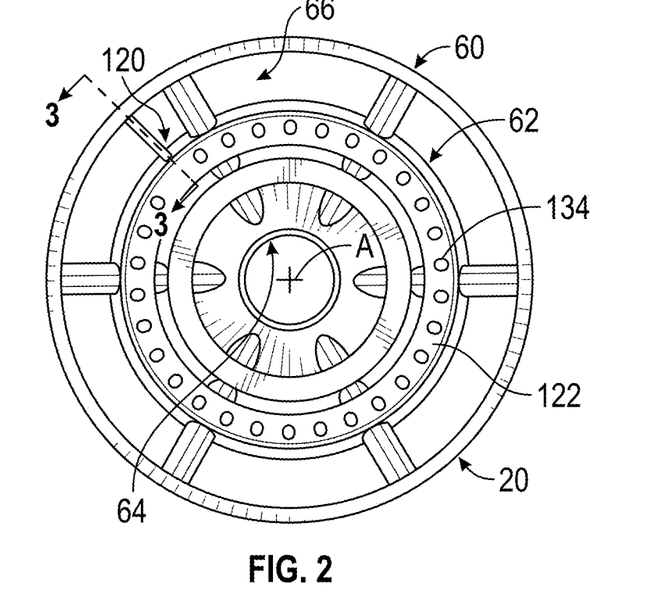
FIG. 2 is an end view of the gas turbine engine.
Figure 3:
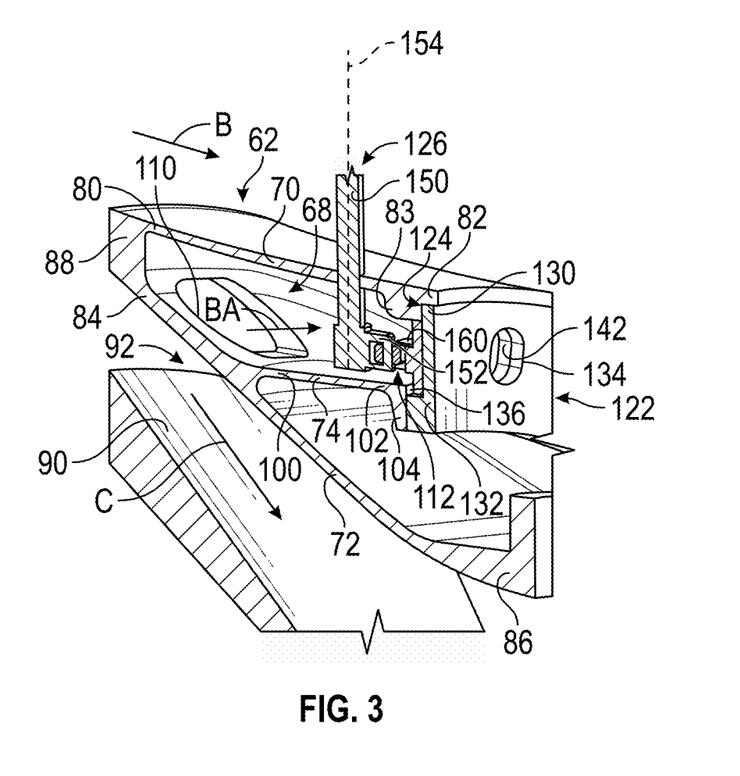
FIG. 3 is a partial perspective view of a portion of a bleed valve system of the gas turbine engine.

Referring to FIGS. 2 and 3, a case 60 is disposed about a main body 62 of the gas turbine engine 20 which houses at least a portion of a gas turbine engine core 64 of the gas turbine engine 20. The case 60 and the main body 62 are both disposed about the central longitudinal axis A. The case 60 may be an intermediate case of the gas turbine engine 20. At least a portion of the bypass flow path B flows through a bypass duct 66 that is defined between the case 60 and the main body 62. The gas turbine engine core 64 is arranged such that the core flow path C is directed towards the compressor section 24. A portion of airflow, BA, along the core flow path C may be diverted or bled through a bleed air duct 68 that is disposed radially inboard of the bypass duct 66.

Referring to FIG. 3, the main body 62 includes a first wall 70, a second wall 72, and an intermediate wall 74. The first wall 70 extends between a first wall first end 80 and a first wall second end 82. The first wall 70 includes or defines a first mounting lug or a first protrusion 83 that extends from an inner surface of the first wall 70 towards the second wall 72. The first protrusion 83 is axially disposed between the first wall first end 80 and the first wall second end 82 and is axially spaced apart from the first wall second end 82.

The second wall 72 is disposed radially inboard relative to the first wall 70 such that the second wall 72 is disposed closer to the central longitudinal axis A. The second wall 72 extends between a second wall first end 84 and a second wall second end 86. An end wall 88 of the main body 62 radially extends between the first wall first end 80 and the second wall first end 84.

The second wall 72 is spaced apart from a partition or end wall 88 of the gas turbine engine core 64 such that a core flow duct 92 is defined therebetween. The core flow duct 92 is disposed radially inboard of the bypass duct 66 and the bleed air duct 68 such that the bleed air duct 68 is radially disposed between the bypass duct 66 and the core flow duct 92.

The intermediate wall 74 is radially disposed between the first wall 70 and the second wall 72. The intermediate wall 74 extends between an intermediate wall first end 100 and an intermediate wall second end 102. The intermediate wall first end 100 is connected to the second wall 72 such that the intermediate wall 74 extends from the second wall 72. The intermediate wall second end 102 includes or defines a lip 104 that radially extends from the intermediate wall 74 towards the second wall 72.

The bleed air duct 68 is defined between the first wall 70 and intermediate wall 74. The bleed air duct 68 is arranged to receive at least a portion of the airflow, BA, through a bleed air inlet 110 and exhausts/bleeds the portion of the airflow, BA, through a bleed air outlet 112 and into the bypass flow path B. The bleed air inlet 110 is defined by the second wall 72 and is disposed between the end wall 88, the second wall first end 84, and the intermediate wall first end 100. The bleed air outlet 112 is defined between the first wall second end 82 and the intermediate wall second end 102.

Referring to FIGS. 2-7, the gas turbine engine 20 is provided with a bleed valve system 120. The bleed valve system 120 is provided to facilitate substantially uniform flow through the bleed air duct 68 and into the bypass duct 66 or into the bypass flow path B during actuation of the bleed valve system 120.

Referring to FIGS. 2 and 3, the bleed valve system 120 includes a retaining ring 122, a metering ring 124, and a drive assembly 126. The retaining ring 122 and the metering ring 124 are arcuate rings that are disposed about at least a portion of the gas turbine engine core 64.

Figure 4:
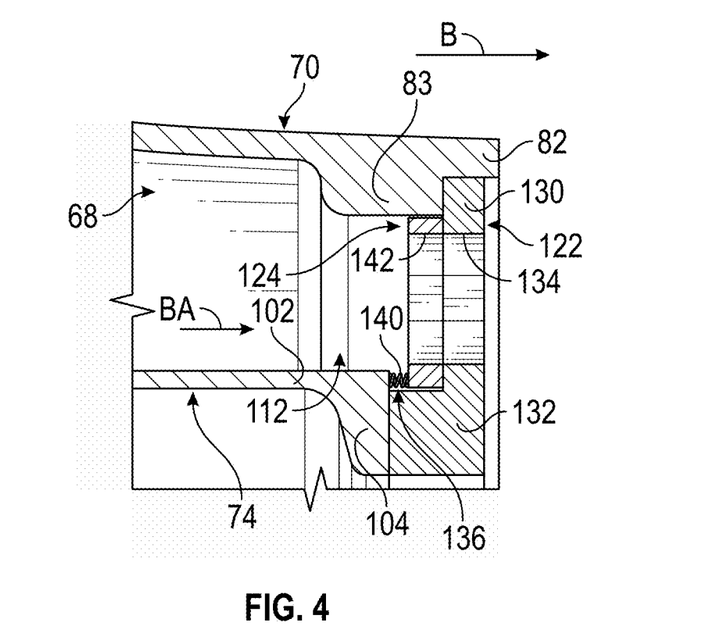
FIG. 4 is a cross-sectional view of a portion of the bleed valve system.

Referring to FIGS. 2-4, the retaining ring 122 abuts an end of the bleed air duct 68 and is disposed at the bleed air outlet 112. The retaining ring 122 radially extends between the first wall second end 82 and the intermediate wall second end 102.

The retaining ring 122 includes a first portion 130 and a second portion 132 that extends from the first portion 130 towards the lip 104 of the intermediate wall 74. A distal end of the first portion 130 engages an inner surface of the first wall 70. The distal end of the first portion 130 is disposed between the first wall second end 82 and the first protrusion 83. The first portion 130 defines a plurality of retaining ring windows or apertures 134 that extend completely through the first portion 130 of the retaining ring 122.

The second portion 132 axially extends from a proximal end of the first portion 130 towards the intermediate wall second end 102. The second portion 132 engages or abuts the lip 104 of the intermediate wall 74. A pocket 136 is defined between the intermediate wall second end 102, the second portion 132, and the first portion 130.

The retaining ring 122 is joined to the main body 62. Fasteners, welds or other joining methods may be employed such that the distal end of the retaining ring 122 is joined to the first protrusion 83 of the first wall 70 and the proximal end of the retaining ring 122 is joined to the lip 104 of the intermediate wall 74.

The metering ring 124 is at least partially disposed within the bleed air outlet 112 of the bleed air duct 68. The metering ring 124 is configured as a metering synchronous ring that abuts at least the first portion 130 of the retaining ring 122. In the embodiment shown in FIG. 4, a biasing member 140 is disposed within the pocket 136. The biasing member 140 extends between the lip 104 of the intermediate wall second end 102 and a surface of the metering ring 124 such that the biasing member 140 urges the metering ring 124 against the retaining ring 122.

Referring to FIGS. 3 and 4, an inner diameter of the metering ring 124 is at least partially received within the pocket 136. The metering ring 124 is supported at an inner diameter interface between the metering ring 124 and the second portion 132 of the retaining ring 122 by multiple rolling elements that are received within the pocket 136. The metering ring 124 is arranged to be rotated relative to the retaining ring 122 about the central longitudinal axis A to affect a fluid flow through the bypass duct 68.

Figure 5:
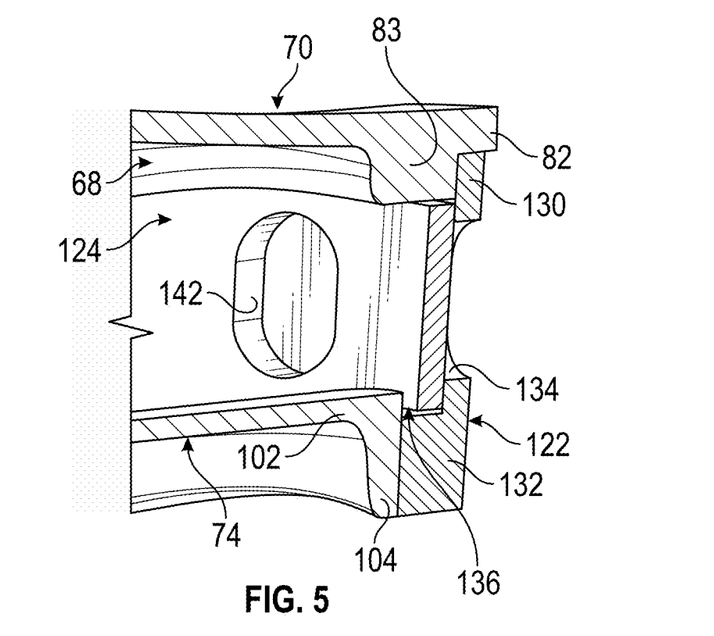
FIGS. 5-7 are illustrative views of the bleed valve system moving between a closed position and an open position.
Figure 6:
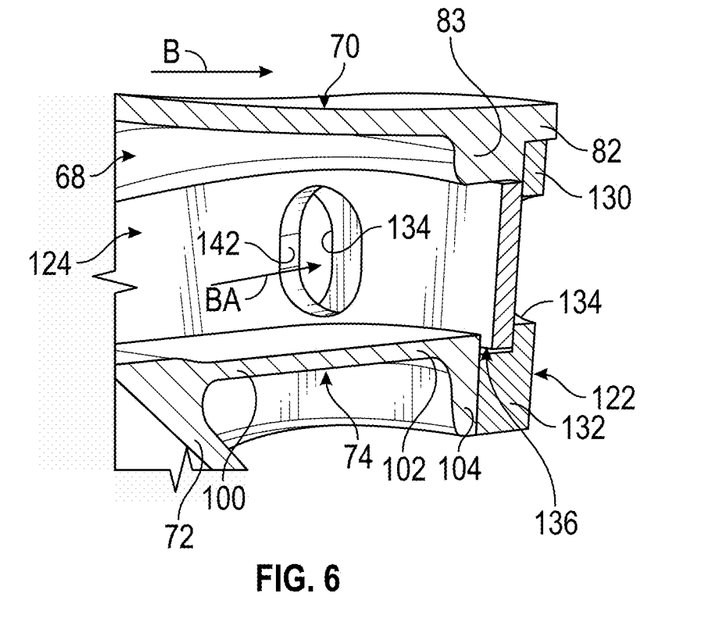
Figure 7:
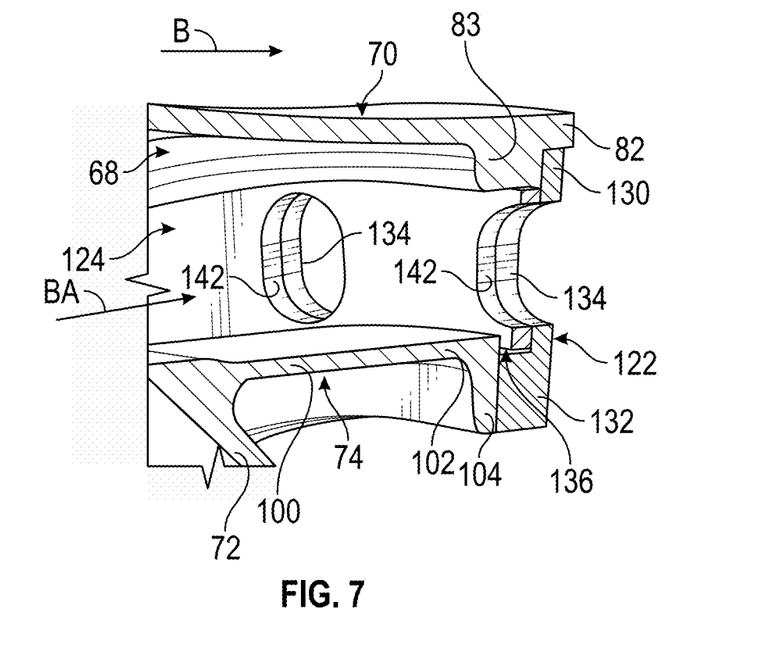

The metering ring 124 defines a plurality of metering ring windows or apertures 142 that extend completely through the metering ring 124. The metering ring 124 is circumferentially actuated by the drive assembly 126 to align the plurality of metering ring apertures 142 with the plurality of retaining ring apertures 134 to facilitate the portion of airflow, BA, to flow through the bleed air duct 68 and into the bypass flow path B while the bleed valve system 120 is in an open position, as shown in FIGS. 4, 6, and 7. The metering ring 124 is circumferentially actuated by the drive assembly 126 to misalign the plurality of metering ring apertures 142 relative to the plurality of retaining ring apertures 134 to inhibit the portion of airflow, BA, to flow through the bleed air duct 68 while the bleed valve system 20 is in a closed position, as shown in FIG. 5. Furthermore, while the bleed valve system 120 is in the closed position, the portion of airflow, BA, loads the metering ring 124 against the retaining ring 122 to aid in maintaining the bleed valve system 120 in the closed position.

Referring to FIGS. 2 and 3, the drive assembly 126 includes a drive shaft 150 and a lever arm 152. The drive shaft 150 extends through the case 60, through the first wall 70 of the main body 62, and into the bleed air duct 68. The drive shaft 150 extends along an axis 154 that is disposed transverse to the central longitudinal axis A.

The lever arm 152 extends along an axis that is disposed generally parallel to the engine longitudinal axis A and is disposed generally perpendicular to the axis 154. The lever arm 152 extends between and is operatively connected to the drive shaft 150 and the metering ring 124. The lever arm 152 is connected to a bracket 160 that is provided by or extends from the metering ring 124.

Referring to FIGS. 5-7, the drive shaft 150 is arranged to rotate about the axis 154 to actuate the lever arm 152 to circumferentially actuate the metering ring 124 relative to the retaining ring 122 to move the metering ring 124 and ultimately the bleed valve system 120 between the closed position and the open position.

As shown in FIG. 5, the plurality of metering ring apertures 142 are misaligned with the plurality of retaining ring apertures 134 such that the bleed valve system 120 is in the closed position to inhibit a fluid flow through the bleed air duct 68.

As shown in FIG. 6, actuation of the drive shaft 150 results in the lever arm 152 causing the metering ring 124 to be rotated about the central longitudinal axis A relative to the retaining ring 122 to at least partially align the plurality of metering ring apertures 142 with the plurality of retaining ring apertures 134 to move the bleed valve system 120 from the closed position towards the partially open position to facilitate a fluid flow through the bleed air duct 68.

As shown in FIG. 7, continued or further actuation of the drive shaft 150 results in the lever arm 152 further rotating the metering ring 124 about the central longitudinal axis A relative to the retaining ring 122 to align the plurality of metering ring apertures 142 with the plurality of retaining ring apertures 134 to place the bleed valve system 120 into the fully open position to facilitate a fluid flow through the bleed air duct 68.

The bleed valve system 120 employing the driven metering ring 124 having the plurality of metering ring apertures 142 and the stationary retaining ring 122 having the plurality of retaining ring apertures 134 facilitates uniform flow through the bleed air duct 68 and into the bypass flow path B during actuation or rotation of the metering ring 124.

Furthermore, the bleed valve system 120 provides a simplified design that reduces an overall parts count and reduces potential failure modes.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A bleed valve system for a gas turbine engine, comprising:
   a retaining ring that abuts an end of a bleed air duct, the retaining ring defining a plurality of retaining ring apertures;
   a metering ring that is at least partially disposed within the bleed air duct and abuts the retaining ring, the metering ring defining a plurality of metering ring apertures, the metering ring being rotatable relative to the retaining ring to selectively facilitate a fluid flow through the bleed air duct, the metering ring having at least one bracket; and
   a drive shaft that extends into the bleed air duct and is operatively connected to the at least one bracket by a lever arm.

2. The bleed valve system of claim 1, wherein the drive shaft is arranged to rotate about an axis such that the lever arm moves to rotate the metering ring relative to the retaining ring.

3. A bleed valve system, comprising:
   a main body that is disposed about a central longitudinal axis, the main body having a first wall that extends between a first wall first end and a first wall second end, a second wall that extends between a second wall first end and a second wall second end, and an intermediate wall disposed between the first wall and the second wall and extends between an intermediate wall first end and an intermediate wall second end; and
   a retaining ring that is disposed between the first wall and the intermediate wall, the retaining ring having a first portion that defines a plurality of retaining ring apertures and a second portion that extends from the first portion towards the intermediate wall second end;
   a metering ring that abuts the first portion, the metering ring defining a plurality of metering ring apertures, wherein a pocket is defined between the intermediate wall second end, the second portion, and the first portion; and
   a biasing member disposed in the pocket, the biasing member being arranged to urge the metering ring against the retaining ring.

4. The bleed valve system of claim 3, wherein the metering ring is at least partially received within the pocket.

5. The bleed valve system of claim 3, wherein the intermediate wall first end is connected to the second wall.

6. A bleed valve system, comprising:
   a main body that is disposed about a central longitudinal axis, the main body having a first wall that extends between a first wall first end and a first wall second end, a second wall that extends between a second wall first end and a second wall second end, and an intermediate wall disposed between the first wall and the second wall and extends between an intermediate wall first end and an intermediate wall second end; and
   a retaining ring that is disposed between the first wall and the intermediate wall, the retaining ring having a first portion that defines a plurality of retaining ring apertures and a second portion that extends from the first portion towards the intermediate wall second end; and
   a metering ring that abuts the first portion, the metering ring defining a plurality of metering ring apertures, wherein the main body has an end wall that extends between the first wall first end and the second wall first end.

7. A gas turbine engine, comprising:
   a case surrounding a main body that is disposed about a central longitudinal axis, the main body having a first wall that extends between a first wall first end and a first wall second end, a second wall that extends between a second wall first end and a second wall second end, and an intermediate wall disposed between the first wall and the second wall and extends between an intermediate wall first end and an intermediate wall second end, wherein a bleed air duct is defined between the first wall and the intermediate wall; and
   a bleed valve system, comprising:
      a retaining ring that is disposed between the first wall and the intermediate wall, the retaining ring having a first portion that defines a plurality of retaining ring apertures and a second portion that extends from the first portion towards the intermediate wall second end;
      a metering ring that abuts the first portion, the metering ring defining a plurality of metering ring apertures;
      a lever arm that is operatively connected to the metering ring; and
      a drive shaft that extends through the first wall and into the bleed air duct and is operatively connected to the lever arm.

8. The gas turbine engine of claim 7, wherein a bleed air inlet is defined by the second wall.

9. The gas turbine engine of claim 8, wherein the bleed air inlet is disposed between the first wall first end and the intermediate wall first end.

10. The gas turbine engine of claim 8, wherein a bleed air outlet is defined between first wall second end and the intermediate wall second end.

11. The gas turbine engine of claim 10, wherein a bypass duct is defined between the case and the first wall.

12. The gas turbine engine of claim 7, wherein the drive shaft is arranged to actuate the lever arm to rotate the metering ring about the central longitudinal axis relative to the retaining ring to move the bleed valve system between an open position and a closed position.

13. The gas turbine engine of claim 12, wherein the plurality of metering ring apertures are approximately aligned with the plurality of retaining ring apertures while the bleed valve system is in the open position to facilitate a fluid flow through the bleed air duct.

14. The gas turbine engine of claim 12, wherein the plurality of metering ring apertures are not aligned with the plurality of retaining ring apertures while the bleed valve system is in the closed position to inhibit a fluid flow through the bleed air duct.

* * * * *